United States Patent [19]
Johnson et al.

[11] 3,881,740
[45] May 6, 1975

[54] WHEELED SNOWMOBILE STORAGE PALLET

[76] Inventors: Bruce A. Johnson, 1165 128th Avenue N.E.; Marvin D. Webster, 12957 Pierce St. N.E., both of Blaine, Minn. 55433

[22] Filed: May 2, 1973

[21] Appl. No.: 356,285

[52] U.S. Cl................................ 280/79.1; 214/506
[51] Int. Cl............................................... B62b 5/00
[58] Field of Search............. 280/35, 79.1; 180/5 R; 214/505, 506; 108/51; 248/119, 346

[56] References Cited
UNITED STATES PATENTS

| | | | |
|---|---|---|---|
| 2,782,045 | 2/1957 | Hulbert............................. | 280/79.1 |
| 3,104,770 | 9/1963 | Calkins et al...................... | 214/505 |
| 3,149,738 | 9/1964 | Bombardier........................ | 180/5 R |
| 3,633,774 | 1/1972 | Lee.................................... | 280/79.1 |

FOREIGN PATENTS OR APPLICATIONS

| | | | |
|---|---|---|---|
| 1,322,043 | 2/1963 | France.............................. | 280/79.1 |

*Primary Examiner*—Robert B. Reeves
*Assistant Examiner*—H. Grant Skaggs
*Attorney, Agent, or Firm*—Clarence A. O'Brien; Harvey B. Jacobson

[57] ABSTRACT

A low silhouette horizontal pallet of generally T-shape in plan including a longitudinal main body portion and a transversely enlarged cross portion at one end of the body portion. The opposite ends of the pallet include slightly downwardly projecting supporting caster wheels and the pallet may be approached from the end thereof remote from the transversely enlarged crosshead portion by a snowmobile moving in a forward direction. The low silhouette of the pallet and the narrowness of the end thereof approached by the snowmobile enables that end to be received beneath the forward portion of the snowmobile body between the forward opposite side skis of the snowmobile and the front end of the center endless track of the snowmobile to engage and move at least partially up onto the terminal end of the snowmobile during its forward movement prior to the forward ends of the opposite side forward skis of the snowmobile contacting the opposite side portions of the crosshead portion of the pallet. Upon engagement of the snowmobile endless track assembly with the pallet the end thereof engaged by the endless track is rocked downwardly into engagement with the surface upon which the caster wheels of the pallet rest, the caster wheels at the downwardly inclined end of the pallet being spaced from the terminal end thereof so that contact of the terminal end of the pallet with the supporting surface may be made after only slight rocking of the pallet about the adjacent caster wheels. Contact of the pallet with the ground will of course frictionally retain the pallet in position and thus the snowmobile may be driven up onto the pallet without the engagement of the forward ends of the skis with the opposite side portions of the remote end of the pallet causing the latter to be pushed along forward of the associated snowmobile.

4 Claims, 5 Drawing Figures

PATENTED MAY 6 1975 3,881,740

WHEELED SNOWMOBILE STORAGE PALLET

SUMMARY OF THE INVENTION

The main object of this invention is to provide a pallet upon which a snowmobile may be conveniently stored in an elevated position slightly spaced above the ground or other surface upon which the pallet rests.

Another object of this invention is to provide a pallet for storing a snowmobile and provided with slightly depending caster wheel assemblies whereby the pallet and a snowmobile supported therefrom may be readily rolled from one position to another when desired.

Another object of this invention is to provide a pallet of the rollable type onto which a snowmobile may be readily driven without the need for means to anchor the snowmobile in place.

A further object of this invention, in accordance with the immediately preceding object, is to provide a snowmobile storage pallet from which a snowmobile may be driven without the snowmobile storage pallet being "kicked" rearwardly as the snowmobile is driven therefrom, even though the pallet is provided with low silhouette supporting caster wheel assemblies.

Yet another object of this invention is to provide a pallet in accordance with the preceding objects and which may be readily constructed from framing components which are inexpensive and easy to assemble by conventional manufacturing processes.

A final object of this invention to be specifically enumerated herein is to provide a snowmobile pallet in accordance with the preceding objects and which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
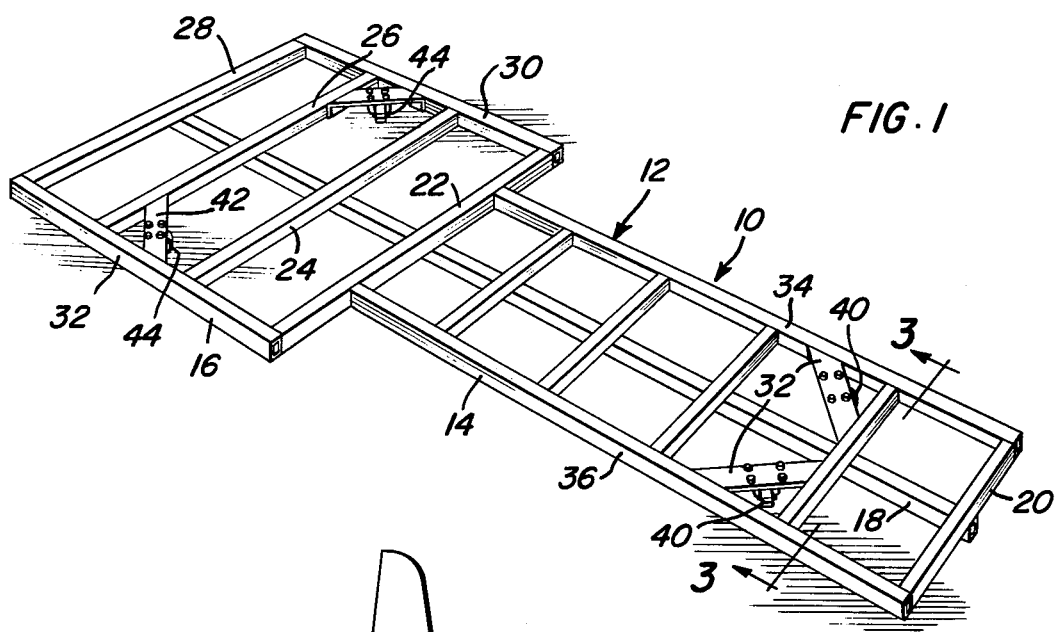
FIG. 1 is a perspective view of the snowmobile pallet of the instant invention.

Referring now more specifically to the drawings, the numeral 10 generally designates the storage pallet of the instant invention. The pallet 10 comprises a horizontal framework 12 which is generally T-shaped in plan including a narrow longitudinal first end portion 14 and a transversely widened second end portion or crosshead portion 16.

The framework 12 includes a central longitudinal tubular member 18 and a first set of five transverse frame members 20 spaced along the end portion 14. In addition, a second set of longer transverse members 22, 24, 26 and 28 are spaced along the second end portion 16. The transverse members 20 as well as the members 22, 24, 26 and 28 are secured over corresponding portions of the longitudinal member 18 and to the latter in any convenient manner such as by welding, the longitudinal member and transverse members comprising tubular metal stock which is substantially square in cross section.

The corresponding ends of the transverse members 22, 24, 26 and 28 are interconnected by means of opposite side tubular members 30 and 32 and corresponding ends of the tubular members 20 are interconnected by means of opposite side longitudinal tubular members 34 and 36 to which the transverse members 20 are secured in any convenient manner such as by welding, the members 30 and 32 also being secured to the corresponding transverse members 22, 24, 26 and 28 by means of welding.

The various opposite side longitudinal members and the various transverse members are disposed in the same plane and the first end portion 14 of the framework 12 includes a pair of diagonal braces 38 from the undersides of which a first pair of caster wheel assemblies 40 are dependingly supported. In addition, the second end portion 16 of the framework 12 includes a pair of diagonal braces 42 secured between the opposite ends of the transverse member 26 and the opposite side members 30 and 32 from which a second pair of caster wheel assemblies 44 are dependingly supported.

Figure 3:
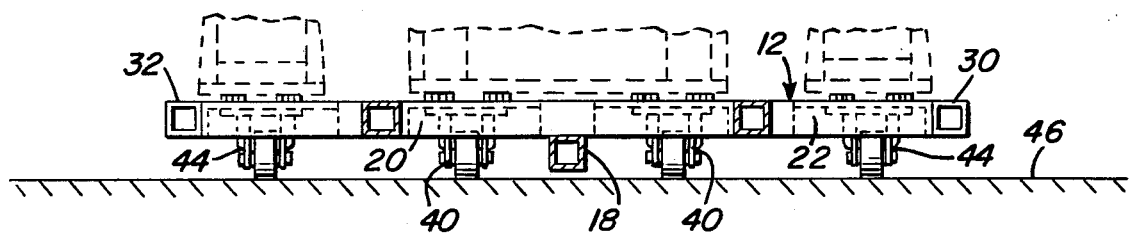
FIG. 3 is an enlarged transverse vertical sectional view taken substantially upon the plane indicated by the section line 3—3 of FIG. 1 and with the lower portion of a snowmobile positioned on the pallet being illustrated in phantom lines.

From FIG. 3 of the drawings it will be noted that the various caster wheel assemblies 40 and 44 are spaced evenly transversely of the framework 12. Also, it may be seen that the undersurface portions of the longitudinal member 18 are only slightly spaced above the surface 46 upon which the caster wheel assemblies 40 and 44 rest.

Figure 2:
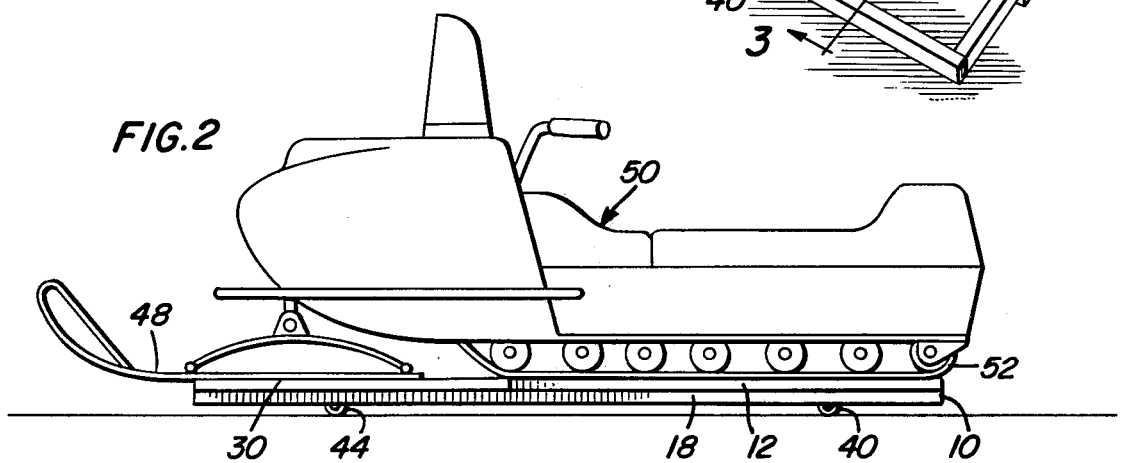
FIG. 2 is a side elevational view of the pallet with a snowmobile positioned thereon.

Inasmuch as most snowmobiles are of the type provided with forward opposite side skis such as the skis 48 of the snowmobile illustrated in FIG. 2 referred to in general by the reference numeral 50 and also a center longitudinally extending endless track assembly 52 spaced slightly rearward of the skis 48, it may be appreciated that the pallet 10 will handle the majority of snowmobiles. In addition, although this basic type of snowmobile is presently manufactured in slightly different sizes, the exemplary dimensions of the pallet 10 set forth hereinafter will accept substantially all snowmobiles of the type represented by the snowmobile 50.

The overall length of the framework is approximately 6 feet, the width of the first end portion 14 is approximately 1 foot 4 inches and the width of the second end portion 16 is approximately 2 feet 8 inches. Further, the length of the second end portion 16 is approximately 2 feet 6 inches and the caster wheel assemblies 40 and 44 project downwardly below the longitudinal member 18 approximately three quarters of an inch.

Actually, the width of the end portion 14 of the framework 12 may lie between one foot and two feet.

Figure 4:
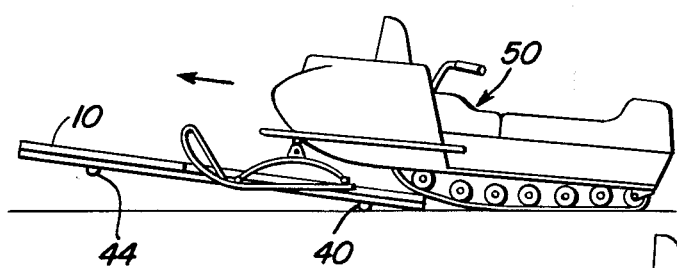
FIG. 4 is a side elevational view illustrating the manner in which the structure of the pallet enables a snowmobile to be driven up onto the pallet without the need for means to maintain the wheeled pallet stationary.

Further, the length of the end portion 14 of the framework 12 may be between 3 and 4 feet, with the understanding that the length of the end portion 14 of the framework 12 will be at least slightly greater than the distance between transverse planes containing the forwardmost extremities of the skis 48 which contact a flat surface and the forwardmost extremity of the endless track assembly 52 which contacts the same flat surface. This will enable the front end of the endless track assembly 52 to be driven up onto the terminal end of the end portion 14 in the manner illustrated in FIG. 4 of the drawings before the front ends of the skis 48 engage the rearmost opposite side portions of the end portions 16 of the framework 12. When the snowmobile 50 is thus driven up onto the terminal end of the end portion 14 the pallet 10 is inclined upwardly at its forward end as the rear end of the framework 12 is rocked about the rear caster wheels 40 and down into contact with the surface 46. Thus, with a portion of the snowmobile bearing down directly upon the rear end of the longitudinal member 18 which rests upon the surface 46, the pallet 10 is maintained stationary as further movement of the snowmobile 50 up onto the pallet causes the forward ends of the skis 48 to engage the opposite ends of the transverse member 22 defining the rear opposite side portions of the forward end portion 16 of the framework 12. Of course, continued forward movement of the snowmobile up onto the pallet 10 will thereafter cause the latter to rock back to the horizontal position and the snowmobile may be moved forwardly on the pallet 10 until it is positioned as illustrated in FIG. 2 of the drawings. Then, the pallet 10 may be moved with the snowmobile 50 thereon to any desired location by rolling the pallet 10 over the surface 46.

Figure 5:
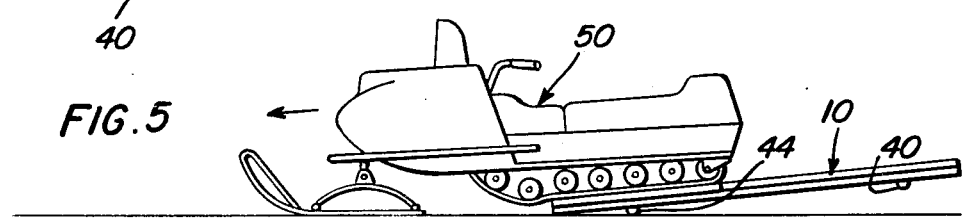
FIG. 5 is a side elevational view of the pallet illustrating the manner in which a snowmobile may be driven therefrom independent of means to anchor the pallet in stationary position.

When it is desired to drive the snowmobile 50 off the pallet 10, the snowmobile is driven forwardly on the pallet until the skis 48 move off the transverse member 28 and engage the surface 46. Then, as the endless track 50 is driven slightly forwardly the pallet 10 moves rearwardly beneath the snowmobile 50 until the weight of the snowmobile 50 on the forward extremity of the framework 12 is sufficiently to cause the framework to tilt to the position thereof illustrated in FIG. 5 of the drawings with the forward end of the longitudinal member 18 engaged with the surface 46. At this point, the pallet 10 will be maintained stationary by its frictional engagement with the surface 46 and the snowmobile 50 may be driven completely from the pallet 10.

Inasmuch as the pallet will undoubtedly be subject to exposure to water by melting snow and ice, the framework 12 is preferably constructed of a nonrusting metal such as aluminum. In addition, the weight of the pallet 10 is maintained at a minimum inasmuch as only the longitudinal and transverse members are used to support the snowmobile 50, there being no need to provide a flooring on the pallet 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a snowmobile of the type including forward opposite side longitudinal skis and a centrally disposed longitudinally extending endless drive track whose forward end is spaced appreciably rearward of the forward ends of said skis, a storage pallet comprising an elongated low profile horizontal body having a first end portion of a width less than the distance between the forward opposite side skis of said snowmobile, said body including opposite side outwardly projecting lateral extensions spaced from the free end of said first end portion and disposed adjacent the other end of said body, said extensions extending longitudinally of the other end portion of said body, the remote outer portions of said extensions being spaced apart a distance greater than the distance between the outer side marginal edges of said skis, the distance between said free end of said first end portion of said body and the adjacent portions of said extensions being greater than the distance between the forwardmost point of contact of said track with a flat support surface upon which said snowmobile is resting and the forwardmost point of contact of said skis with said support surface, the opposite end portions of said body including sets of dependingly supported opposite side low silhouette ground engaging support wheels spaced from the corresponding terminal ends of said body a distance whereby the body, when inclined and supported from a flat surface by only one set of said wheels and the corresponding terminal end of said body, will be inclined only slightly relative to said surface at an angle represented by an incline of less than one unit of measure rise per ten units of length.

2. The combination of claim 1 wherein the width of said body between the remote outer portions of said extensions is greater than 16 inches.

3. The combination of claim 2 wherein the distance between the free end of the first end portion of said body and the adjacent portions of said extensions is approximately 3½ feet.

4. The combination of claim 2 wherein the distance between the free end of the first end portion of said body and the adjacent portions of said extensions is greater than 3 feet.

* * * * *